United States Patent
Schweigkofler et al.

(10) Patent No.: US 11,905,483 B2
(45) Date of Patent: Feb. 20, 2024

(54) TRIBOLOGICAL SYSTEM

(71) Applicant: KLUEBER LUBRICATION MUENCHEN SE & CO. KG, Munich (DE)

(72) Inventors: Martin Schweigkofler, Friedberg (DE); Balasubramaniam Vengudusamy, Munich (DE); Stefan Seemeyer, Wolfratshausen (DE); Dirk Loderer, Gilching (DE)

(73) Assignee: KLUEBER LUBRICATION MUENCHEN SE & CO. KG, Munich (DE)

( * ) Notice: Subject to any disclaimer, the term of this patent is extended or adjusted under 35 U.S.C. 154(b) by 0 days.

(21) Appl. No.: 17/759,924

(22) PCT Filed: Nov. 5, 2020

(86) PCT No.: PCT/EP2020/081127
§ 371 (c)(1),
(2) Date: Aug. 2, 2022

(87) PCT Pub. No.: WO2021/155968
PCT Pub. Date: Aug. 12, 2021

(65) Prior Publication Data
US 2023/0063820 A1 Mar. 2, 2023

(30) Foreign Application Priority Data
Feb. 3, 2020 (DE) ............ 10 2020 102 645.5

(51) Int. Cl.
| C10M 103/06 | (2006.01) |
| --- | --- |
| C10M 109/00 | (2006.01) |
| C10M 133/20 | (2006.01) |
| C10M 171/06 | (2006.01) |
| C10M 173/00 | (2006.01) |
| C10N 50/00 | (2006.01) |
| C10N 20/06 | (2006.01) |
| C10N 40/02 | (2006.01) |
| C10N 40/04 | (2006.01) |

(52) U.S. Cl.
CPC ........ *C10M 103/06* (2013.01); *C10M 109/00* (2013.01); *C10M 133/20* (2013.01); *C10M 171/06* (2013.01); *C10M 173/00* (2013.01); C10M 2201/02 (2013.01); C10M 2201/0613 (2013.01); C10M 2201/0653 (2013.01); C10M 2201/1033 (2013.01); C10M 2215/1026 (2013.01); C10N 2020/06 (2013.01); C10N 2040/02 (2013.01); C10N 2040/04 (2013.01); C10N 2050/023 (2020.05)

(58) Field of Classification Search
CPC ............ C10M 103/06; C10M 109/00; C10M 133/20; C10M 169/00; C10M 171/06; C10M 173/00; C10M 2201/02; C10M 2201/041; C10M 2201/061; C10M 2201/0613; C10M 2201/065; C10M 2201/0653; C10M 2201/066; C10M 2201/085; C10M 2201/102; C10M 2201/103; C10M 2201/1033; C10M 2205/0285; C10M 2207/1206; C10M 2207/2805; C10M 2209/1033; C10M 2213/0606; C10M 2213/062; C10M 2215/1026; C10M 2217/0456; C10N 2020/06; C10N 2040/02; C10N 2040/04; C10N 2050/023; C10N 2050/025; C23C 28/00; C23C 28/04; C23C 28/042; C23C 28/044; C23C 28/046; F16C 33/6633; F16C 33/6688; F16C 33/6696; F16C 2240/48; Y02E 10/72
See application file for complete search history.

(56) References Cited

U.S. PATENT DOCUMENTS

| 3,359,294 | A | * | 12/1967 | Domba | ............ | C08F 8/42 |
| | | | | | | 528/401 |
| 2009/0118148 | A1 | | 5/2009 | Martin et al. | | |
| 2011/0124537 | A1 | | 5/2011 | Kilthau | | |
| 2013/0129264 | A1 | | 5/2013 | Watanabe et al. | | |
| 2015/0072906 | A1 | | 3/2015 | Hayama | | |
| 2015/0299610 | A1 | * | 10/2015 | Ohyama | ............ | F16C 33/6633 |
| | | | | | | 508/436 |

(Continued)

FOREIGN PATENT DOCUMENTS

| GB | 2068775 A | * | 8/1981 | ............ | G11B 5/71 |
| JP | 2007297592 A | | 11/2007 | | |
| JP | 2011252073 A | | 12/2011 | | |

(Continued)

OTHER PUBLICATIONS

Fedel, M., "Blood Compatibility of diamond-like carbon (DLC) coatings", in Narayan, R., Diamond-Based Materials for Biomedical Applications, Woodhead Publishing, 2013, pp. 71-102 (Year: 2013).*

*Primary Examiner* — James C Goloboy
(74) *Attorney, Agent, or Firm* — LEYDIG, VOIT & MAYER, LTD.

(57) ABSTRACT

A tribological system, comprising a main body and a sandwich lubrication, in which the sandwich lubrication includes a binder-free solid lubricant layer comprising a solid lubricant, and a lubricant layer comprising a lubricant. The binder-free solid lubricant layer and the lubricant layer are present as separate layers on the main body and wherein the mass ratio of solid lubricant to lubricant is at most 0.05:1.

19 Claims, No Drawings

(56) References Cited

U.S. PATENT DOCUMENTS

2015/0367381 A1 12/2015 Sumant
2018/0223208 A1 8/2018 Sumant

FOREIGN PATENT DOCUMENTS

| WO | WO-2006075219 A2 * | 7/2006 | ............. C23C 16/26 |
|---|---|---|---|
| WO | WO 2006075219 A2 | 7/2006 | |
| WO | WO 2009149902 A1 | 12/2009 | |
| WO | WO 2015090597 A1 | 6/2015 | |

* cited by examiner

TRIBOLOGICAL SYSTEM

CROSS-REFERENCE TO PRIOR APPLICATIONS

This application is a U.S. National Phase application under 35 U.S.C. § 371 of International Application No. PCT/EP2020/081127, filed on Nov. 5, 2020, and claims benefit to German Patent Application No. DE 10 2020 102 645.5, filed on Feb. 3, 2020. The International Application was published in German on Aug. 12, 2021 as WO 2021/155968 under PCT Article 21(2).

FIELD

The invention relates to a tribological system, comprising a sandwich lubrication including a binder-free solid lubricant as well as its production. The invention also relates to the sandwich lubrication itself and its use for lubricating metallic materials.

BACKGROUND

To lubricate tribological system, such as antifriction and plain bearings, transmissions, chains, sliding guides and joints, lubricating oils and greases are usually used as lubricants. In applications having a high sliding proportion, in particular, binder-free solid lubricant layers and plasma layers are also used. The advantage of solid lubricant layers is that they enable reliable and maintenance-free long-term lubrication even for heavily loaded machine elements. A drawback is, however, their usually short service life.

When tribological systems are lubricated with lubricating oils or greases, they have disadvantages especially in the field of low speeds as well as with low temperatures. But even at high speeds, a state of insufficient lubrication can occur due to temporary displacement or spinning off of the viscous lubricant from the tribological contact leading in turn to high friction and wear. This is relevant, in particular, since in new applications an increasingly long service life is expected due to increasingly wear-resistant layers.

US 2015367381 (A1) and US 2018223208 (A1) describe a wearing surface having a coefficient of friction in the superlubricity range, including graphene and nano particles on the wearing surface, as well as a wear-resistant surface having a long service life, including graphene, which is exposed to hydrogen. The application of graphene and nano particles is preferably carried out from a solution (Solution Processed Graphene, SPG). The described method enables the creation of a binder-free solid layer. As explained above, there is a drawback in that the solid layer has a short service life. Moreover, it does not lead to the desired reduction in friction and wear at high speeds, especially in the field of hydrodynamic lubrication.

SUMMARY

In some aspects, disclosed is a tribological system, comprising a main body and a sandwich lubrication, in which the sandwich lubrication includes a binder-free solid lubricant layer comprising a solid lubricant, and a lubricant layer comprising a lubricant. The binder-free solid lubricant layer and the lubricant layer are present as separate layers on the main body and wherein the mass ratio of solid lubricant to lubricant is at most 0.05:1.

In some aspects, disclosed is a sandwich lubrication, comprising a binder-free solid lubricant layer comprising a solid lubricant, and a lubricant layer comprising a lubricant, in which the mass ratio of solid lubricant to lubricant is at most 0.05:1, and wherein the binder-free solid lubricant layer and the lubricant layer are present as separate layers.

In some aspects, disclosed is a method of manufacturing a tribological system, comprising the steps of providing a main body; applying a binder-free solid lubricant layer comprising a solid lubricant on the main body; applying a lubricant layer comprising a lubricant on the main body provided with the binder-free solid lubricant, in which the mass ratio of solid lubricant to lubricant is at most 0.05:1, such that the binder-free solid lubricant layer and the lubricant layer are present as separate layers on the main body.

In some aspects, disclosed is A tribological system comprising a sandwich lubrication, wherein the sandwich lubrication comprises a binder-free solid lubricant layer comprising a solid lubricant, and a lubricant layer comprising a lubricant, wherein the mass ratio of solid lubricant to lubricant is at most 0.05:1 and wherein the binder-free solid lubricant layer and the lubricant layer are present as separate layers on the main body. The tribological system is, or is located in, an antifriction bearing, a plain bearing, a transmission, a chain, a sliding guide, a joint, a ball joint, a wheel bearing of automotive vehicles, a bearing of a wind turbine, a bearing having a high sliding proportion, a rotating plain bearing, a ventilator bearing, a linearly guided plain bearing, a knitting machine, an axial cylindrical rolling body bearing, or an actuating and adjusting device.

DETAILED DESCRIPTION

It is the object of the present invention to provide a tribological system having a lubrication, which combines a long service life with high lubricating action, high reduction in friction and wear, in particular at high speeds.

The object is achieved by a tribological system, comprising a main body and a sandwich lubrication, wherein the sandwich lubrication includes a binder-free solid lubricant layer comprising a solid lubricant, and a lubricant layer comprising a lubricant, wherein the binder-free solid lubricant layer and the lubricant layer are present as separate layers on the main body and wherein the mass ratio of solid lubricant to lubricant is at most 0.05:1.

Surprisingly, it has been found that the combination according to the present invention of a binder-free solid lubricant layer and a lubricant layer at a certain ratio, can achieve a sandwich lubrication having significantly improved lubricating action and, in particular, reduced wear, as compared to the respective individual components. This can significantly increase the service life of tribological systems.

This effect was surprising because it was not to be expected that binder-free solid lubricants are stable enough to be combined with lubricants. Rather, it had to be expected that the solid lubricants are detached from the main body by the lubricant.

Without being restricted to a mechanism, it is assumed that, when there is a higher mass ratio of solid lubricant to lubricant of above 0.05:1, the solid lubricant is present on the surface of the main body in a plurality of layers, which leads to structural discontinuities between the solid lubricant layers, and the adhesion of the solid lubricant on the surface deteriorates. This makes it easier for the lubricant to penetrate the solid lubricant layer and cause detachment.

To understand the term "binder-free" in the context of the present invention, it should be noted that in the solid lubricant layer there is no binder, in particular no organic polymer, such as polyamide-imide (PAI), polyurethane (PU), epoxy resin, phenolic resin, phenoxy resin, melamine resin, acrylate resin, polyimide (PI), polyether ether ketone (PEEK), polyether ketone (PEK), polyether sulfone (PES), isocyanate, polyol, silicone resin or mixtures thereof. The term "no binder" should be understood to mean that binder is contained at most in traces, i. e., in percentages below 20 wt.-% in relation to the mass of the solid lubricant layer.

An advantage of the use of binder-free solid lubricant layers is that the firing process common with sliding lacquers, i. e., binder-containing layers, can be dispensed with. This can help to avoid thermal stressing of the main body during application of the sandwich lubrication. Moreover, material savings are possible by dispensing with binders.

Moreover, the combination according to the invention of a binder-free solid lubricant layer and a lubricant layer has the advantage that the solid lubricant can function as a barrier between the lubricant and the surface to be lubricated and can thus reduce material incompatibilities and material damage by the lubricant, such as white etching cracks (WEC). Moreover, the barrier action can also improve protection against corrosion and wear. This applies, in particular, to the use of graphene as the solid lubricant since its density is particularly high.

According to the invention, the solid lubricant layer includes a solid lubricant. Preferred solid lubricants are selected from the group comprising polytetrafluoroethylene (PTFE), molybdenum disulfide, graphite, graphene, boron nitride (hexagonal), tin(IV) sulfide, zinc(II) sulfide, tungsten disulfide, metal sulfide, calcium phosphate, silicate and layered silicate, talcum, mica and mixtures thereof. Further preferably the solid lubricant layers are selected from plasma coatings obtained by means of chemical vapor deposition (CVD) or physical vapor deposition (PVD), such as diamond like carbon (DLC) nitride and/or carbide layers.

Particularly preferred solid lubricants are selected from the group comprising polytetrafluoroethylene (PTFE), metal sulfide, in particular molybdenum disulfide, zinc(II) sulfide, tin(IV) sulfide, tungsten disulfide, graphite, graphene, boron nitride (hexagonal), tungsten disulfide, calcium phosphate, silicate and layered silicate, in particular talcum, mica and mixtures thereof.

Even more preferred solid lubricants are selected from the group comprising graphite, graphene, boron nitride (hexagonal), calcium phosphate, silicate and layered silicate, in particular talcum, mica and mixtures thereof.

The particle size distribution of the solid lubricant preferably has a d50 value of 0.3 nm to 50 μm, more preferably 1 nm to 1 μm, in particular 1 nm to 0.5 μm.

To determine the particle size, depending on the particle size,
laser diffraction in accordance with ISO 13320:2009-10 (>100 nm) or
dynamic light scattering in accordance with ISO 22412: 2017 (publication date 2017-02) (1 nm to 100 nm) or
TEM (Metrologia. 2013 November; 50(6): 663-678, Particle size distributions by transmission electron microscopy: an interlaboratory comparison case study, Stephen B. Rice, Christopher Chan, Scott C. Brown, Peter Eschbach, Li Han, David S. Ensor, Alksandr B. Stefaniak, John Bonevich, Andras E. Vladár, Angela R. Hight Walker, Jiwen Zheng, Catherine Starnes, Arnold Stromberg, Jia Ye and Eric A. Grulke) (<1 nm) is used.

The solid lubricants can be applied on the main body by well-known methods, for example by means of spraying, dipping, spinning, polishing in, tumbling, printing or plasma coating.

According to the invention, the mass ratio of solid lubricant to lubricant is at most 0.05:1, for example 0.000001:1 to 0.05:1, preferably at most 0.02:1, for example 0.000001:1 to 0.02:1. Mass ratios of solid lubricant to lubricant of 0.0001:1 to 0.02:1 or 0.0001:1 to 0.05:1 are also conceivable. It has been found that a mass ratio of solid lubricant to lubricant of at most 0.05:1 is advantageous since higher ratios can cause detachment effects, which in turn can lead to increased friction and reduced service life.

Preferably, the thickness of the solid lubricant layer, measured by means of transmission spectroscopy, is not more than 1 μm, for example 0.3 nm to 1 μm, preferably 0.3 nm to 100 nm.

According to the invention, the solid lubricant layer and the lubricant layer are present on the main body as separate layers. According to the invention, preferably, the lubricant layer is arranged on the side of the solid lubricant layer facing away from the main body. This can be achieved, for example, by applying the solid lubricant layer and the lubricant layer one after the other on the main body, wherein preferably, the solid lubricant layer is applied first, followed by the lubricant layer. This has the advantage that a stable, coherent and dense solid lubricant layer can be formed on the main body. This is why this solid lubricant layer does not migrate out of the tribological system due to thermal (Maragoni effect) or mechanical effects (spinning off due to centrifugal forces). Moreover, dispersing agents in the lubricant can be dispensed with. Also, a solid lubricant layer can be combined with a variety of lubricants and thus various requirement profiles can be fulfilled.

The tribological system according to the invention includes a main body. This can contain both metallic and non-metallic materials, in particular composite materials, aluminum, aluminum alloys, steel, stainless steel and cast materials, non-ferrous metals, plastic materials, fiber-reinforced plastic materials and/or polymers. The main body can be subjected to common pre-processing procedures, such as sand blasting, phosphating, smoothing, roughening.

Moreover, the tribological system according to the invention typically includes a counter-body able to move relative to the main body. Preferably, the counter-body includes composite materials, aluminum, aluminum alloys, steel, stainless steel and cast materials, non-ferrous metals, plastic materials, fiber-reinforced plastic materials, polymers and/or mixtures thereof. Further, it is conceivable for the counter-body to also be provided with a binder-free solid lubricant layer.

According to the invention, the lubricant layer comprises a lubricant. The latter is preferably selected from lubricating oils, lubricating greases and aqueous lubricants and mixtures thereof.

If a lubricating oil and/or a lubricating grease is used as a lubricant, it preferably includes synthetic oils, mineral and/or or native oils as the main component (>50 wt.-%). Depending on their use, these oils can be used alone or in combination.

Synthetic oils comprise, in particular, esters of an aliphatic or aromatic di-, tri- or tetracarboxylic acid, comprising one or more $C_7$- to $C_{22}$-alcohols present in mixtures, furthermore esters of trimethylolpropane, pentaerythritol or dipentaerythritol with aliphatic $C_7$- to $C_{22}$-carboxylic acids, $C_{18}$ dimer acid esters with $C_7$- to $C_{22}$-alcohols, as well as complex esters. A complex ester according to the invention is a polyester which is produced by a reaction of polyols with dicarboxylic acids and, as the case may be, monocarboxylic acids. Poly-α-olefins (PAO) or metallocene catalyzed PAOs, alkylated naphthalines, alkylated benzenes, polyglycols, silicones, perfluoroethers and poly(p-phenylene ether) or alkylated di- or triphenyl ethers are synthetic oils which can be used according to the invention.

The mineral oils are preferably selected from paraffin-base, naphthene-base and aromatic hydrocracking oils, and gas-to-liquid (GTL) liquids. GTL describes a method of producing liquid hydrocarbons from natural gas. Preferred native oils are triglycerides from animal/vegetable sources, refined in accordance with well-known methods, such as hydrogenation. The particularly preferred triglyceride oils are triglyceride oils having a high oleic acid content. Typically used vegetable oils having a high oleic acid content are safflower oil, corn oil, rape-seed oil, sunflower oil, soyabean oil, linseed oil, peanut oil, lesquerella oil, meadowfoam oil and palm oil.

Particularly preferably, the lubricating oil and/or lubricating grease contain a base oil selected from the group comprising polyglycols, perfluoro polyethers and esters containing di-, tri- or tetracarboxylic acid, comprising one or more $C_7$- to $C_{22}$-alcohols present in mixtures, furthermore esters of trimethylolpropane, pentaerythritol or dipentaerythritol with aliphatic $C_7$- to $C_{22}$-carboxylic acids, $C_{18}$ dimer acid esters with $C_7$- to $C_{22}$-alcohols, complex esters, poly-α-olefins (PAO) or metallocene catalyzed PAOs and mixtures thereof.

Aqueous lubricants are preferably selected from lubricants having water contents of more than 20 wt.-% water in relation to the overall weight of the lubricant. Preferably, they are transparent liquids, thus not oil-in-water or water-in-oil emulsions. To adjust the viscosity, aqueous lubricants preferably include polyacrylates, polymethacrylates, polyvinylpyrrolidone cellulose derivatives, e. g., reaction products of cellulose and sulfonic acid or alkylated celluloses, or sugar derivatives, such as reaction products of sugar and carboxylic acid. Particularly preferably, the aqueous lubricants contain polyalkylene glycol, preferably in a mole mass of 200 to 35000 g/mol.

The monomer units of the polyalkylene glycols can be selected from ethylene oxide and/or propylene oxide, present as a block polymer or as statistically distributed polymers. Polyalkylene glycols are preferred which are produced with starters, selected from water, mono-, di- and trifunctional alcohols containing up to 40 carbon atoms. Further preferably, the aqueous lubricants contain carboxylic acid esters having chain lengths of $C_4$ to $C_{40}$ polyoxyethylene and/or polyoxypropylene units.

Moreover, the lubricant preferably contains common additives against corrosion, such as metal salts, carboxylic acids, esters, nitrogen-containing compounds and heterocyclic compounds. Free-radical scavengers are preferably used against oxidation, such as aromatic amines or substituted phenoles. Chelate-forming compounds are preferably used to protect against metallic influences. Phosphorus- and sulfur-containing compounds, e. g., zinc dialkyldithiophosphate, are preferably used as wear protection agents on metallic surfaces. Glycerol mono- or diesters, or polyimides, polytetrafluoroethylene (PTFE), graphite, metal oxides, boron nitride, molybdenum disulfide and phosphates in solid form, are preferably used to reduce the coefficient of friction. Polyisobutylene or polymethacrylates are preferably used as viscosity improvers. Ionic liquids can also be used, for example to increase the electric conductivity of the lubricant or to increase the service live of the lubricant.

If a lubricating grease is used as the lubricant, it preferably contains a thickening agent. Preferred thickening agents are selected from urea, aluminum complex soaps, metal mono-soaps and elements of the $1^{st}$ and $2^{nd}$ main group of the periodic table of elements, metal complex soaps of the elements of the $1^{st}$ and $2^{nd}$ main group of the periodic table of elements, bentonite, sulfonate, silicate, polyimide or PTFE and a mixture of the afore-mentioned thickening agents. In the case of urea, this means a reaction product of a diisocyanate, preferably 2,4-diisocyanato toluene, 2,6-diisocyanatotoluene, 4,4'-diisocyanatodiphenylmethane 2,4'-diisocyanato diphenylmethane, 4,4'-diisocyanatodiphenyl, 4,4'-diisocyanato-3,3'-dimethyldiphenyl, 4,4'-diisocyanato-3,3'-dimethylphenylmethane, which can be used alone or in combination, with an amine and/or diamine of the general formula $(H_2N)_xR$, wherein x=1 or 2, and R is an aryl, alkyl or alkylene residue having 2 to 22 carbon atoms, which are present alone or in combination.

In a preferred embodiment of the invention, the tribological system is formed as a tribological system which is operated under inconstant hydrodynamic conditions, particularly preferably as an antifriction or plain bearing, transmission, chain, sliding guide and joint, in particular as a wheel bearing of automotive vehicles, as a bearing of wind turbines and/or as a bearing having a high sliding proportion, such as a rotating plain bearing, such as a ventilator bearing, or as a linearly guided plain bearing, such as in knitting machines, as an axial cylindrical rolling body bearing, for example in actuating and adjusting devices for heavy loads in mechanical engineering and/or as a rotor bearing of wind turbines or as a small bearing, in a metallic and/or non-metallic configuration and/or as a ball joint, in particular as a ball joint for use in the automotive industry.

A further subject matter of the present invention is a method of manufacturing a tribological system, comprising the steps of:
1. providing a main body;
2. applying a binder-free solid lubricant layer comprising a solid lubricant on the main body;
3. applying a lubricant layer comprising a lubricant on the main body provided with the binder-free solid lubricant, wherein the mass ratio of solid lubricant to lubricant is at most 0.05:1, such that the binder-free solid lubricant layer and the lubricant layer are present as separate layers on the main body.

The matters discussed relating to the tribological system according to the invention apply in the same manner to the features of the method and, in particular, to its preferred embodiments.

A further subject matter of the invention is a sandwich lubrication, comprising
   a binder-free solid lubricant layer comprising a solid lubricant, and
   a lubricant layer comprising a lubricant, wherein the mass ratio of solid lubricant to lubricant is at most 0.05:1 and wherein the binder-free solid lubricant layer and the lubricant layer are present as separate layers.

A further subject matter of the invention is the use of a sandwich lubrication, comprising
   a binder-free solid lubricant layer comprising a solid lubricant, and
   a lubricant layer comprising a lubricant, wherein the mass ratio of solid lubricant to lubricant is at most 0.05:1 and wherein the binder-free solid lubricant layer and the lubricant layer are present as separate layers on the main body, for the lubrication of tribological systems comprising metallic and/or non-metallic materials, such as of antifriction or plain bearings, of transmissions, chains, sliding guides and joints, in particular of wheel bearings of automotive vehicles, of bearings of wind turbines and/or of bearings having a high sliding proportion, such as of rotating plain bearings, such as ventilator bearings, or of linearly guided plain bearings, such as in knitting machines, of axial cylindrical rolling body bearings, for example in actuating and adjusting devices for heavy loads in mechanical engineering and/or of rotor bearings of wind turbines or of small bearings, in metallic and/or non-metallic configurations and/or of ball joints, in particular of ball joints for use in the automotive industry.

In a preferred embodiment, the tribological systems have surfaces comprising metallic and/or non-metallic materials, preferably composite materials, aluminum, aluminum alloys, steel, stainless steel and cast materials, non-ferrous metals, plastic materials, fiber-reinforced plastic materials and/or polymers.

The matters discussed relating to the tribological system according to the invention apply in the same manner to the features of the sandwich lubrication and, in particular, to its preferred embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A tribological system, comprising a main body and a sandwich lubrication, wherein the sandwich lubrication includes
   a binder-free solid lubricant layer comprising a solid lubricant, and
   a lubricant layer comprising a lubricant,
   wherein the binder-free solid lubricant layer and the lubricant layer are present as separate layers on the main body and wherein the mass ratio of solid lubricant to lubricant is at most 0.05:1, and
   wherein the lubricant is an aqueous lubricant.

2. The tribological system according to claim 1, wherein the solid lubricant comprises polytetrafluoroethylene (PTFE), molybdenum disulfide, graphite, graphene, boron nitride (hexagonal), tin(IV) sulfide, zinc(II) sulfide, tungsten disulfide, metal sulfide, calcium phosphate, silicate and layered silicate, talcum, mica, or mixtures thereof, and/or the solid lubricant layer is selected from plasma coatings obtained by means of chemical vapor deposition (CVD) or physical vapor deposition (PVD).

3. The tribological system according to claim 1, wherein the solid lubricant comprises polytetrafluoroethylene (PTFE), metal sulfide, graphite, graphene, boron nitride (hexagonal), calcium phosphate, silicate, layered silicate, or mixtures thereof.

4. The tribological system according to claim 1, wherein the particle size distribution of the solid lubricant has a d50 value of 0.3 nm to 50 μm.

5. The tribological system according to claim 1, wherein the thickness of the solid lubricant layer, measured by means of transmission spectroscopy, is not more than 1 μm.

6. The tribological system according to claim 1, further comprising a counter-body, which is movable relative to the main body.

7. The tribological system according to claim 1, optionally further comprising a counter-body which is movable relative to the main body, wherein the main body and/or the counter-body, if present, independently comprise composite materials, aluminum, aluminum alloys, steel, stainless steel, cast materials, non-ferrous metals, plastic materials, fiber-reinforced plastic materials, and/or polymers.

8. The tribological system according to claim 1, wherein the tribological system is configured to be operated under inconstant hydrodynamic conditions.

9. The tribological system according to claim 1, wherein the lubricant is a lubricating oil and/or a lubricating grease, which comprise a synthetic oil, a mineral and/or or a native oil as the main component.

10. The tribological system according to claim 1, wherein the lubricating oil and/or lubricating grease contains a base oil comprising polyglycols; perfluoro polyethers and esters containing di-, tri- or tetracarboxylic acid comprising one or more $C_7$- to $C_{22}$-alcohols present in mixtures; esters of trimethylolpropane, pentaerythritol or di-pentaerythritol with aliphatic $C_7$- to $C_{22}$-carboxylic acids; $C_{18}$ dimer acid esters with $C_7$- to $C_{22}$-alcohols; complex esters; poly-α-olefins (PAO); metallocene catalyzed PAOs; or mixtures thereof.

11. The tribological system according to claim 9, wherein the lubricating grease contains a thickening agent comprising urea, aluminum complex soaps, metal mono-soaps and elements of the $1^{st}$ and $2^{nd}$ main group of the periodic table of elements, metal complex soaps of the elements of the $1^{st}$ and $2^{nd}$ main group of the periodic table of elements, bentonite, sulfonate, silicate, polyimide or PTFE, or any mixture thereof.

12. A sandwich lubrication, comprising:
   a binder-free solid lubricant layer comprising a solid lubricant, and
   a lubricant layer comprising a lubricant, wherein the mass ratio of solid lubricant to lubricant is at most 0.05:1,
   wherein the binder-free solid lubricant layer and the lubricant layer are present as separate layers, and
   wherein the lubricant is an aqueous lubricant.

13. A method of manufacturing a tribological system, comprising the steps of:
   providing a main body;
   applying a binder-free solid lubricant layer comprising a solid lubricant on the main body;
   applying a lubricant layer comprising a lubricant on the main body provided with the binder-free solid lubricant,
   wherein the mass ratio of solid lubricant to lubricant is at most 0.05:1, such that the binder-free solid lubricant layer and the lubricant layer are present as separate layers on the main body, and
   wherein the lubricant is an aqueous lubricant.

14. The tribological system according to claim 1, wherein the tribological system is, or is located in, an antifriction bearing, a plain bearing, a transmission, a chain, a sliding guide, a joint, a ball joint, a wheel bearing of automotive vehicles, a bearing of a wind turbine, a rotating plain bearing, a ventilator bearing, a linearly guided plain bearing, a knitting machine, an axial cylindrical rolling body bearing, or an actuating and adjusting device.

15. The tribological system according to claim 2, wherein the solid lubricant layer comprises diamond like carbon (DLC) nitride and/or carbide layers.

16. The tribological system according to claim 3, wherein the metal sulfide comprises molybdenum disulfide, zinc(II) sulfide, tin(IV) sulfide, tungsten disulfide, or mixture thereof, and/or wherein the layered silicate comprises mica.

17. The tribological system according to claim 8, wherein the tribological system is, or is located in, an antifriction bearing, a plain bearing, a transmission, a chain, a sliding guide, a joint, a ball joint, a wheel bearing of automotive vehicles, a bearing of a wind turbine, a rotating plain bearing, a ventilator bearing, a linearly guided plain bearing, a knitting machine, an axial cylindrical rolling body bearing, or an actuating and adjusting device.

18. The tribological system according to claim 11, wherein the thickening agent comprises urea, and the urea is a reaction product of a diisocyanate and an amine and/or diamine of the general formula $(H_2N)_xR$, wherein x=1 or 2, and R is an aryl, alkyl or alkylene residue having 2 to 22 carbon atoms, which are present alone or in combination, and optionally wherein the diisocyanate is selected from 2,4-diisocyanato toluene, 2,6-diisocyanatotoluene, 4,4'-diisocyanatodiphenylmethane 2,4'-diisocyanato diphenylmethane, 4,4'-diisocyanatodiphenyl, 4,4'-diisocyanato-3,3'-dimethyldiphenyl, and 4,4'-diisocyanato-3,3'-dimethylphenylmethane, or any mixture thereof.

19. The tribological system according to claim 1, wherein the lubricant is an aqueous lubricant having a water content of more than 20 wt.-% water, in relation to the overall weight of the lubricant.

* * * * *